Oct. 22, 1929.  A. E. WALLER  1,732,346
BATTERY CHARGING APPARATUS
Filed June 16, 1925   4 Sheets-Sheet 1
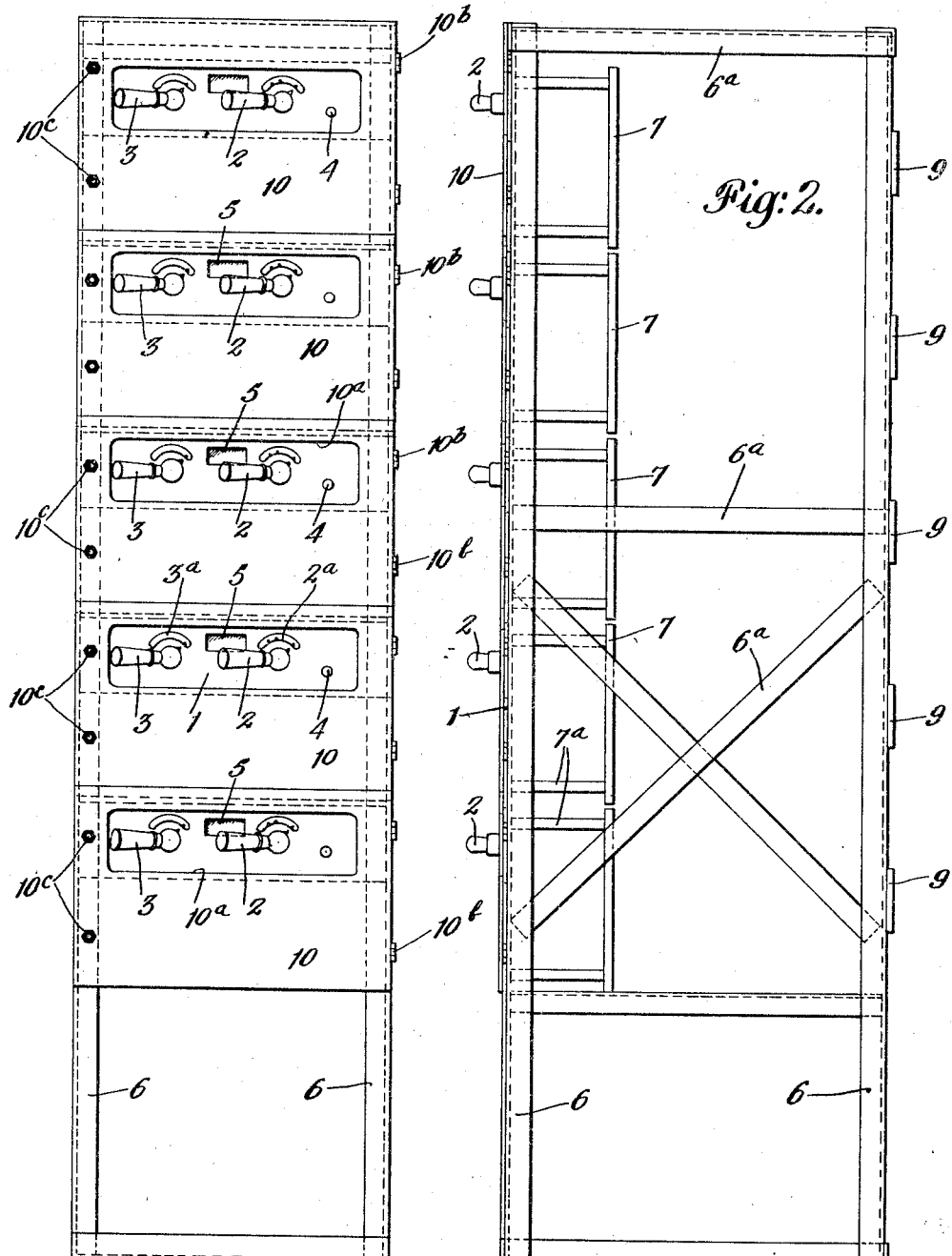
Fig:1.  Fig:2.
Inventor
Alfred E. Waller
By his Attorneys
Edwards, Sager & Bower

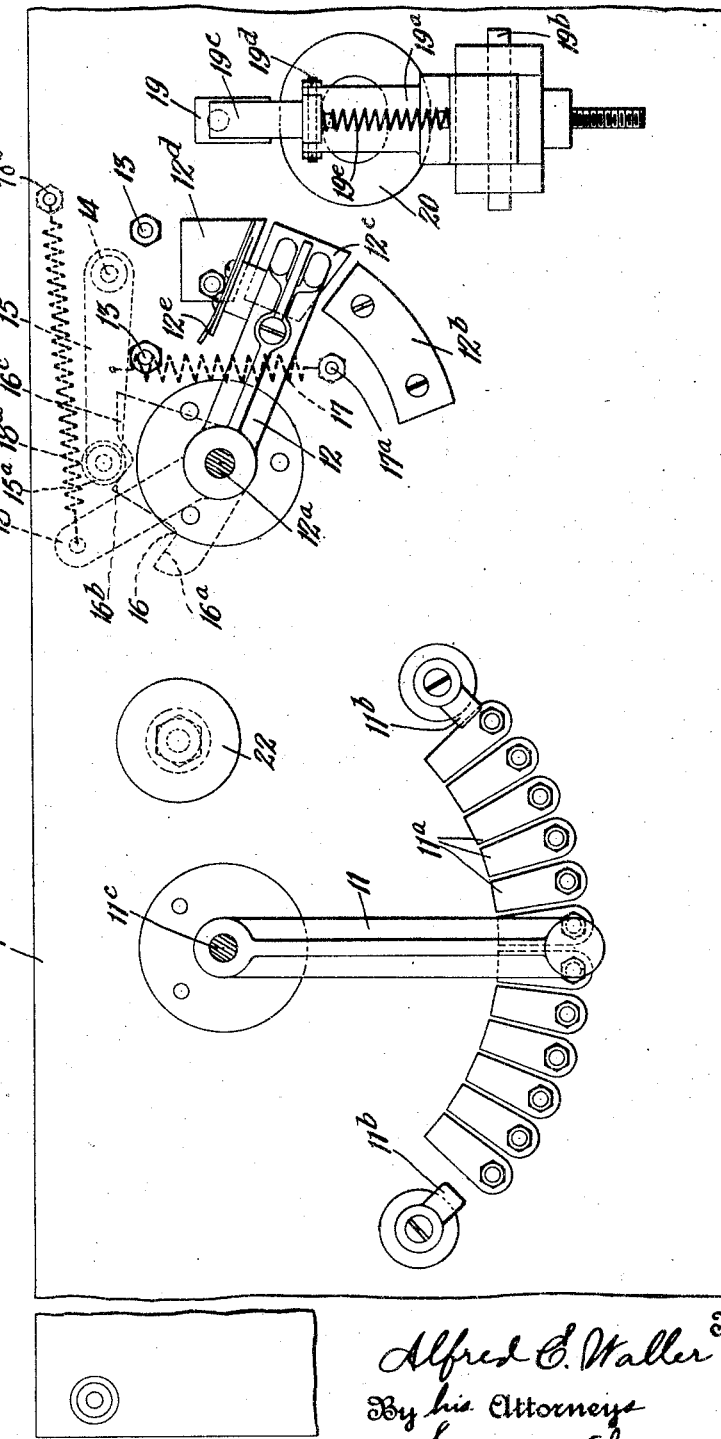

Oct. 22, 1929.  A. E. WALLER  1,732,346
BATTERY CHARGING APPARATUS
Filed June 16, 1925  4 Sheets-Sheet 4
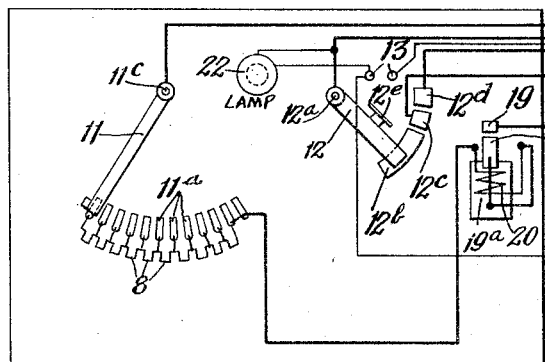
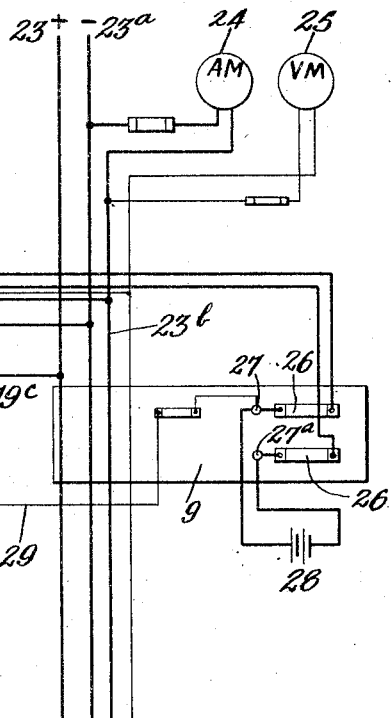
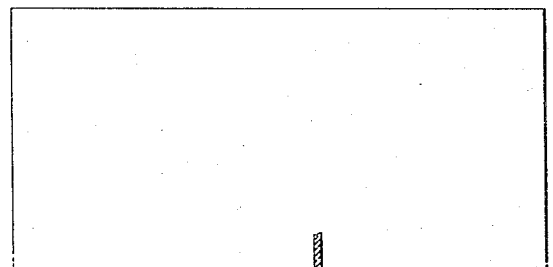
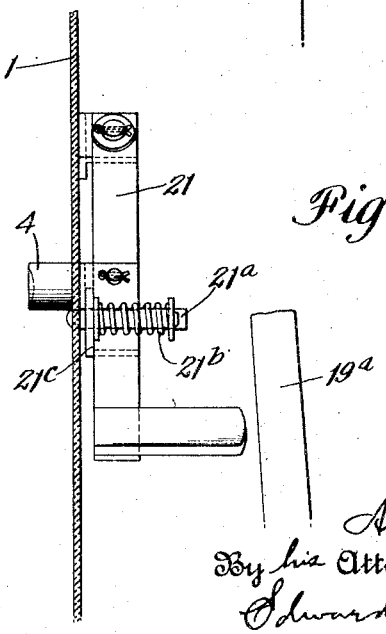

Patented Oct. 22, 1929

1,732,346

UNITED STATES PATENT OFFICE

ALFRED E. WALLER, OF BRONXVILLE, NEW YORK, ASSIGNOR TO WARD LEONARD ELECTRIC COMPANY, A CORPORATION OF NEW YORK

BATTERY-CHARGING APPARATUS

Application filed June 16, 1925. Serial No. 37,543.

Although this invention relates particularly to battery charging apparatus, yet some features thereof are applicable to other purposes.

One particular object of this invention is to provide enclosed and protected battery charging apparatus and yet provide means whereby the apparatus may be conveniently and readily inspected for repairs or renewals. It has heretofore been common to provide a series of panels with controlling apparatus, whereby the panels are adapted to charge batteries respectively connected thereto. In structures of this character it is desirable that the controlling apparatus and circuits shall be enclosed and protected; also that no parts likely to be dangerous or easily deranged should be exposed on the face of the panel. On the other hand, if the parts are so concealed by the panel that it is necessary to remove various handles and other parts in order to enable the apparatus to be inspected and repaired, it not only requires considerable expense and labor and prolonged non-use of the apparatus, but experience has shown that such detachable devices when subjected to continued use, result in the parts being permanently loosened and greatly worn so that proper operation of the apparatus is seriously impaired. In accordance with this invention, the panels and apparatus are arranged so that all parts may be quickly and conveniently inspected without the necessity of removing any handles or other parts, while at the same time the apparatus is enclosed and protected and only the manually movable parts required for operation are exposed.

Another object of this invention is the provision of a concealed and easily accessible signal lamp for each unit which will indicate to the operator when a battery to be charge is connected to the circuit of any panel. Another object is to provide automatic protection against reversed current or abnormally low current by an automatic switch, which shall be so located that it may be manually closed by simple and convenient means such as a push-button operated from the front of the panel. Another object is to provide convenient means whereby the voltage and charging current of a battery connected to any panel may be conveniently read by a temporary connection of instruments to anyone of the panel circuits. Another object is to insure the off or protective position of the apparatus before the enclosing cover can be opened or closed.

Other objects and features of this invention will be understood from the following description and accompanying drawings.

Fig. 1 is a front elevation of a group of enclosed panels showing the exposed hand operated elements;

Fig. 2 is a side view thereof, the controlling apparatus being omitted and showing only the relative location of the panels and supporting parts;

Fig. 4 is a front view of the inner panel of one unit;

Fig. 5 is a diagram of the circuit connections of one unit to the main lines, and to a battery to be charged; and Fig. 6 is a side view partly in section of parts of the apparatus.

Figure 3:
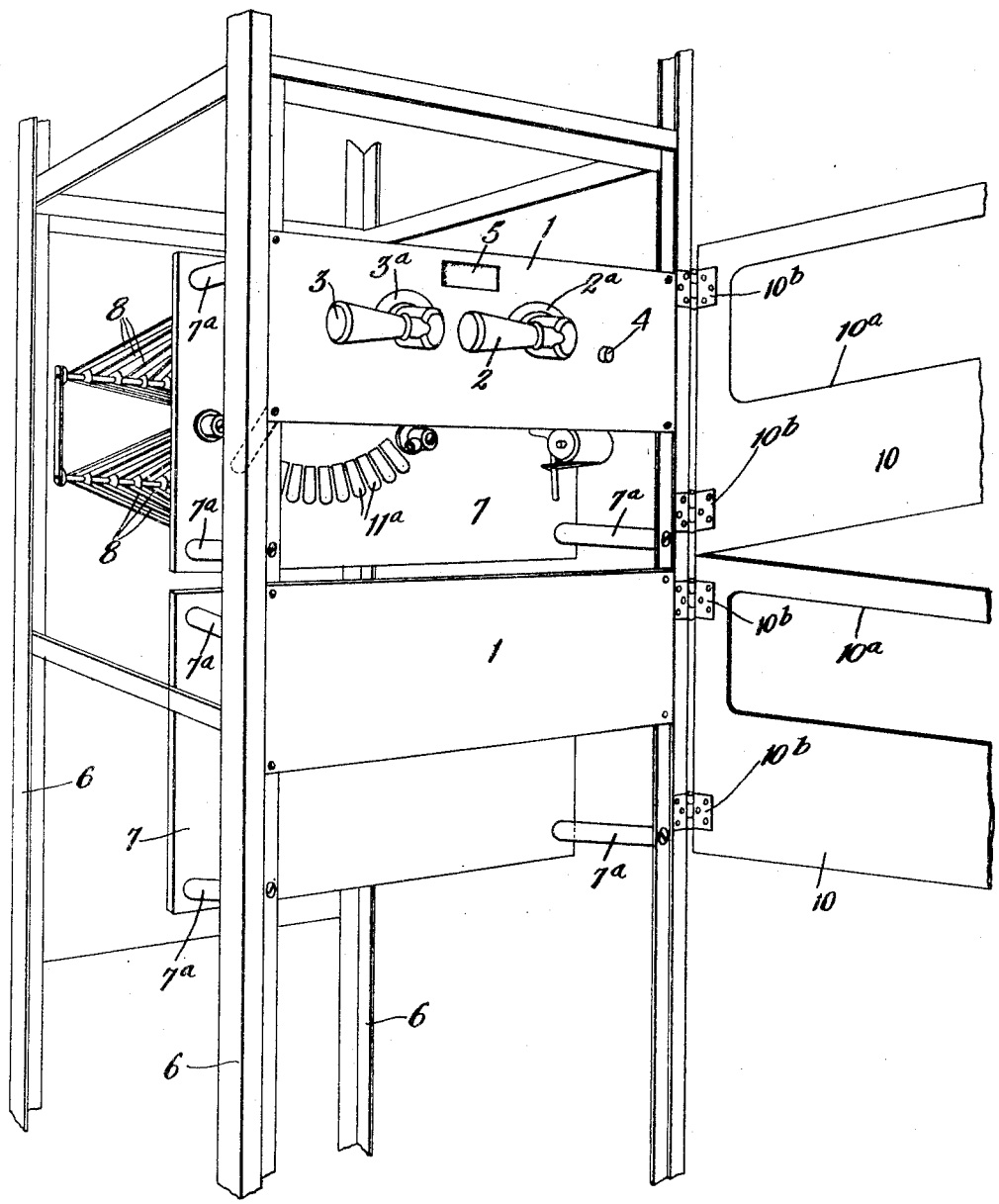
Fig. 3 is a perspective view of a portion of the apparatus showing the panels and controlling apparatus of one unit of the group, the front cover being opened.

Referring to Figs. 1 and 2, the structure illustrated is shown as enclosing and supporting five battery charging units, the front controlling panel 1 of each unit having a handle 2 for operating the main switch, a resistance controlling handle 3, a push-button 4 for closing the automatic switch, and a glass plate 5 to indicate by means of a pilot light in the rear, when a battery is connected to the circuit of that unit. An indicator and plate $2^a$ indicates the off, on and meter position of the switch element 2, and a plate $3^a$ in relation to a pointer on the resistance element 3 indicates in a general way the amount of resistance in circuit.

The group of elements is shown supported by four upright angle irons 6, which extends from the floor to the full height of the group and there are provided cross connecting plates $6^a$ extending between the angle irons 6. Each of the panels 1 is secured to the front of the frame and spaced apart from each other as indicated in Figs. 1 and 2. In the rear of each of the panels 1 is respectively located a panel 7 spaced apart from the front panels and supported by rods 7ª from the front angle irons of the frame. The panels 7 are of insulating material and are larger than the panels 1 and support the controlling apparatus respectively for the different units.

The space between the panels 7 and the rear of the frame is occupied by the resistors 8 as shown in Fig. 3, and although these are shown of the channeled self-supporting resistor type, any other form of resistance elements may be used. On the back of the frame are mounted a series of panels 9, which carry respectively the fuses and terminal connections for the circuits of each controlling panel. Any number of groups as shown in Figs. 1 and 2, may be mounted side by side for controlling any desired number of battery circuits required in the charging station, and any exposed sides or backs may be enclosed.

On the front of the frame of each group is mounted a cover, or series of covers 10. These join each other and extend the full height of the panels, and are each provided with a slotted opening 10ª corresponding respectively with each operating panel; and expose only the necessary amount of such panels to permit operation of the manually operated parts. The shape of these slots or openings is such that each front cover 10 can be removed or opened only when the handles 2 and 3 are in the positions to insure the opening of the main switch and insertion of resistance in the charging circuits; likewise such position of these handles is also insured when closing the cover or placing it in closed position. This is attained by having the openings 10ª so small and so shaped that when the handle 2 of any panel is in the on-position, or the handle 3 in the position where the resistance is materially cut out, these handles come over the face of the cover 10 and thus do not permit the opening of the cover unless these handles are in proper position. Instead of having a series of covers 10 separately openable or removable, a single cover may be used for the front of one group and provided with the series of openings. Each cover 10 is preferably hinged at one side to one of the front angle irons 6 by hinges 10ᵇ indicated in Fig. 1, and also shown in Fig. 3. Each cover 10 is normally secured in closed position by bolts and nuts 10ᶜ extending through a front angle iron 6 and cover 10, as indicated in Fig. 1. The use of such bolts and nuts will normally prevent unauthorized persons from opening the front covers and yet permit convenient opening when desired, although of course the door may be provided with a lock and key if desired instead of the bolts 10ᶜ for locking the door closed.

Referring to Fig. 3, which shows one unit exposed and the doors 10 open, it will be seen that the various parts of the controlling apparatus can readily be inspected or adjusted without removing the controlling handles or removing the front operating panel 1, sufficient space existing between the panels 1 and 7 and between panels 1 vertically to permit convenient inspection and repair of the apparatus.

Referring to Fig. 4 showing a panel 7 and the parts mounted thereon, a pivoted rheostat arm 11 has its outer end adapted to pass over and make contact with a series of contact segments 11ª between which the resistors 8 or other resistance elements are connected. Stops 11ᵇ limit the movement of the contact arm 11 in each of the two limiting positions. When the contact arm is moved to the extreme left-hand position and rests upon the left-hand contact segment, the resistance is all in, and when moved to the extreme right, the resistance is all cut out. The shaft 11ᶜ of the resistance contact arm extends through the front panel 1 and on its front end the handle 3 is fastened. It is secured in such position that when the contact arm 11 is in the resistance all in position, the handle 3 is in the horizontal position shown in Figs. 1 and 3 to permit the opening of the cover 10; and when the contact arm is in position to cut out a substantial amount of resistance, the handle 3 will extend over the cover 10 and not permit its opening or closing, as already explained. Instead of using a set screw or any other common means for detachably locking the handle 3 to the shaft 11ᶜ, which is objectionable for the reasons already explained, I use a permanent fastening means such as a dowel pin extending through the hub of the handle and through the shaft 11ᶜ, which may be driven firmly in place or headed over and secures a permanent fastening which will not wear or work loose or permit play between the handle and the shaft 11ᶜ.

The manually operated main switch is shown located at the right of the rheostat and has a contact arm 12 secured to the shaft 12ª. The contact arm is shown as adapted to engage three segments 12ᵇ 12ᶜ and 12ᵈ. When the arm engages the segment 12ᵇ, it is in the off-position; when engaging the contact segment 12ᶜ, it is in the main charging position; and when engaging the contact segment 12ᵈ, it is in the charging position and also in position to read the charging current supplied from this panel and the voltage of the battery.

The contact arm 12 carries an insulated bridging contact element 12ᵉ, which contacts with and bridges two contacts 13 mounted in fixed position on the panel and connected at the back of the board to a volt meter circuit. Thus when the contact arm is in final position on contact 12ᵈ, the charging current may be read upon an ammeter and the voltage of the battery charged may also be read.

Pivotally mounted on the back of the panel on a stud 14 is a link 15 carrying at its inner end a roller $15^a$ which engages the periphery of a cam mounted on the back of the board on the shaft $12^a$. The cam is shown in dotted lines on Fig. 4 and when the switch is in the off-position the roller $15^a$ engages the depression 16 of the cam and the face of a projection $16^a$ on the cam, which serves as a stop for the movement of the switch beyond the off-position. As the switch is turned counter-clockwise from off-position, the roller $15^a$ will pass over the projection $16^b$ of the cam and seat in a depression at the right of the projection $16^b$, this being the normal running position of the switch, being the position shown in Fig. 4. When the switch-arm is on contact $12^d$ the roller $15^a$ rides up on the projection $16^c$ of the cam but remains in this position only as long as the operator holds the arm 12 on the contact $12^d$. As soon as the operator releases the main switch, it will be thrown to the normal running position on contact $12^c$. This is due to the shape of the projection $16^c$ of the cam and to the fact that link and roller $15^a$ is spring pressed against the periphery of the cam, as by a spring 17 connected to the link 15 at one end and to a stud $17^a$ extending outwardly from the back of the panel.

An arm 18 is also mounted on shaft $12^a$ at the back of the panel and has secured to its outer end a spring $18^a$. This spring is fastened at its other end to a stud $18^b$ mounted on the back of the panel and tends to move the switch arm 12 toward off-position. Thus if the switch arm 12 when engaging contact $12^d$ is released by the operator, the spring $18^a$ will cooperate with the positioning link and roller $15^a$ of the cam to turn the cam and switch-arm to normal running position.

The shaft $12^a$ of the main switch extends forwardly through the front panel 1 and has secured at its front end the main switch handle 2 in the same manner as the handle 3 is secured to the shaft of the resistance arm, so as to avoid the handle working loose, or resulting in wear of the connection between the handle and the shaft. The handle 2 is positioned on the shaft so as to be in horizontal position when arm 12 is in off position.

The automatic main switch is shown mounted at the right of the panel 7 in Fig. 4. This is a single pole switch comprising a fixed contact 19 and a movable contact arm $19^a$ pivotally mounted at the base on a pin $19^b$. The movable contact $19^c$ is yieldably mounted on the contact arm $19^a$ on a pin $19^d$ carried by the arm, a spring $19^e$ being fixed at one end to the arm $19^a$ and at its other end engaging the contact $19^c$ in a direction to cause the contact to yieldably engage the fixed contact when the switch is closed. A series coil 20 is mounted in a vertical plane on the base of the switch and has a central iron core adapted to cooperate with the movable switch arm $19^a$ and retain the switch in closed position under normal conditions.

The automatic switch is closed mechanically by the operator by pressing the push button 4 on the front panel. The button 4 is passed through the panel and is secured at its inner end to a lever 21 shown in Fig. 6 and in dotted lines in Fig. 3. This arm extends in an inclined direction and is pivotally mounted at its upper end on the back of the panel 1. Its lower end engages the arm $19^a$ of the automatic switch when the push button 4 is pressed inwardly. This will cause the automatic switch to close and will then be held closed by the effect of series coil 20 under normal conditions. A stud $21^a$ is mounted upon the panel 1 and extends inwardly at the back of the panel and carries a spring $21^b$. The inner end of the spring engages a washer on the inner end of the stud $21^a$; and the front end of the spring engages a plate $21^c$ carried by the arm 21, the rod $21^a$ passing freely through this plate. Thus the spring tends to push the arm 21 toward the back of the panel 1 and will hold the arm in this position, except when the button 4 is pushed against the force of the spring to close the automatic switch. The manual means for closing the automatic switch and its relation to this switch is shown in Fig. 6.

On the front of the rear panel 7 is mounted a socket and lamp 22 located opposite the glass 5 in the front panel. When the lamp is receiving current, it will illuminate the glass panel 5.

The circuit connections are shown in Fig. 5, the parts being designated by reference characters corresponding to those used in the other drawings. The positive and negative supply lines 23, $23^a$ are shown extending vertically in Fig. 5 and supply current to each unit of the group. The supply line 23 is connected to the fixed contact 19 of the automatic switch. The line $23^a$ is connected to the contact $12^c$ of the main switch. The contact $12^d$ of this switch is connected to a main line $23^b$, which is connected at the upper part of the diagram through an ammeter 24 to the line $23^a$. A volt meter 25 has one terminal connected to the line $23^b$ and the other terminal to the right-hand contact 13 of each unit of the group. The fuse and connection panel 9 of each unit is shown as having the fuses 26 in the circuit from the terminal 27 to the contact arm 11 of the rheostat and in the circuit from the terminal $27^a$ to the contact arm 12 of the main switch respectively. A battery 28 to be charged is connected to the terminals 27, $27^a$. The lamp 22 is connected across the battery terminals so that as soon as a battery is connected to these terminals, the lamp will be illuminated and also while the battery is being charged. The left-hand terminal 13 is connected to the battery terminal 27.

Assuming the parts to be in the off-position, then as soon as a battery to be charged is connected to any pair of battery terminals on the panel 9 or to any convenient circuit extending therefrom, the lamp 22 will be illuminated and indicate to the operator that a battery to be charged is connected to the particular panel where the light shows. Assuming the rheostat contact arm is in the resistance all-in position, the operator will move the main switch 12 to the contact 12ᶜ and push the button 4 momentarily to close the automatic switch. Current will then pass from the positive line 23 through the contacts of the automatic switch, and then through its series coil 20, then through the rheostat and through a fuse 26 to terminal 27, through the battery to terminal 27ᵃ through the other fuse 26 to the contact arm of the main switch and then from the contact 12ᶜ to the negative line 23ᵃ. Flow of current through the series coil 20 will result in this automatic switch being held closed after the button 4 is released by the operator.

The operator may now move the main switch to cause its contact arm 12 to engage the contact 12ᵈ and while holding the main switch in this position against the action of the spring 18ᵃ and the link 15 and its spring 17, may read the charging current on the ammeter 24 and the voltage across the battery terminals by volt meter 25. The ammeter circuit may be traced from the positive line 23, through the automatic switch and rheostat through the battery, through the main switch to contact 12ᵈ to the line 23ᵇ and then through the ammeter to the negative line 23ᵃ. The volt meter circuit may be traced from the positive terminal 27 of the battery through wire 29, through bridging contact 12ᵉ of the terminal 13 and thence through the volt meter to the negative line 23ᵇ. The operator may then adjust the rheostat to supply any desired charging current and at any time desired may move the main switch to secure a reading of current and voltage of the particular battery being charged from any one of the panels. Upon releasing the handle 2, the main switch, as already explained, will be thrown to the normal running position of engagement with the contact 12ᶜ. After the battery is charged, the operator will move the main switch to off-position and the rheostat arm to resistance all-in position; the automatic switch will open automatically upon interruption of the charging circuit, either by gravity or usual spring pressure.

If at any time while the charging circuit is closed, the current should reverse, or become abnormally low, the automatic switch will open, as the electromagnet will exert insufficient magnetic force to retain the switch in closed position. By providing the push button for closing the automatic switch, the latter may be made of a simple and compact form of construction. Also the mechanical means for closure of the automatic switch is mounted on the front panel 1 and operable from the front panel which results in a simple form of construction, these parts being brought into proper relation by the relative positions of the front and rear panels.

By this invention, not only are the parts fully protected and concealed except the manual elements for operation, but the small size of the panel 1 compared to the panel 7 and their relative positions give complete access to the operating parts for inspection and repair when the covers 10 are opened, as is apparent from Fig. 3. Furthermore, the apparatus as described provides means for full control of the circuits and charging current with automatic protection and also means for temporarily reading the current and battery voltage of any one unit, by the use of a volt meter and ammeter, which are common to the various units of the group, or as many groups as may be provided.

While one embodiment of this invention is particularly shown and described, various modifications may be made therein without departing from the scope of this invention.

I claim:—

1. The combination of a frame support, a panel carried by said support, electric controlling apparatus thereon, a second panel shaped to afford access to said controlling apparatus and having elements for manual operation of said controlling apparatus, and a removable cover over said panels, said cover having an opening through which the manual elements may be operated, said opening being shaped to require said manual elements to be in protective positions before said cover can be removed.

2. The combination of a support, a series of panels mounted thereon and spaced apart from each other, electric controlling apparatus mounted on said panels respectively, a second series of panels, and having manually operated elements respectively for operating said controlling apparatus, and a removable cover for said panels, said cover having a plurality of openings corresponding respectively to said panels through which said manual elements may be respectively operated, the shape of said openings being such that said elements must be in protective positions before said cover can be removed.

3. The combination of a support, electric controlling apparatus, said apparatus having manual elements for operating the same, a front panel having said elements on the face thereof, a second panel spaced in the rear of said front panel, and on which said apparatus is mainly mounted, and a removable cover for enclosing said panels and apparatus, said cover having an opening through which said elements may be operated, said front panel having a smaller surface area than said rear panel for accessibility to said controlling apparatus.

4. The combination of a frame support, a series of front panels mounted thereon and spaced apart from each other, a series of rear panels corresponding respectively to said front panels and spaced in the rear thereof, electric controlling apparatus mounted mainly on said rear panels respectively and having manual elements for operating the same on the front of said front panels respectively, and a cover on said frame support for enclosing said panels and apparatus, said cover having a series of openings through which said elements on said front panels may be operated respectively.

5. The combination of a front panel, a rear panel spaced in the rear of said front panel, electric controlling apparatus mounted on the rear and on the front of said rear panel, and manual elements on the face of said front panel for operating said apparatus, said front panel being smaller than said rear panel to afford accessibility to the apparatus on the rear panel.

6. In battery charging apparatus, the combination of a rear panel, controlling apparatus comprising a main switch and a rheostat mounted thereon, a front panel having smaller surface area than said rear panel for accessibility to said switch and rheostat, manual elements on the face of said front panel for controlling said rheostat and main switch, and a removable enclosing cover in front of said front panel, said cover having an opening through which said manual elements may be operated.

7. In battery charging apparatus, a series of rear panels, apparatus comprising a rheostat, main switch and signal mounted on said rear panels respectively, a corresponding series of front panels, manual elements respectively mounted on said front panels for respectively controlling said rheostats and main switches, said front panels having means whereby the condition of said signals may be indicated, and a removable cover for enclosing said panels and apparatus, said cover having an opening through which said elements may be operated and said signal indications observed.

8. In battery charging apparatus, a rear panel, a rheostat and automatic main switch mounted thereon, a front panel having smaller surface area than said rear panel for accessibility to said switch and rheostat, and manually operated elements on said front panel whereby said rheostat may be operated and said switch moved to closed position, said front panel being smaller than said rear panel to afford access to the rheostat and automatic main switch mounted on the rear panel.

9. In battery charging apparatus, a rear panel, controlling apparatus comprising a rheostat, a main switch, an automatic switch and signal mounted on said rear panel, a front panel, manual elements on said front panel whereby said rheostat and main switch may be operated and said automatic switch moved to closed position and having means whereby the condition of said signal may be indicated, and a removable enclosing cover, said cover having an opening through which said elements may be operated and the signal indication observed, the shape of said opening being such that the rheostat and main switch must be in protective positions before said cover can be removed.

ALFRED E. WALLER.